Feb. 2, 1954    K. E. L. GRETTVE    2,667,910
APPARATUS AND METHOD FOR CREPING PAPER
Original Filed July 12, 1945
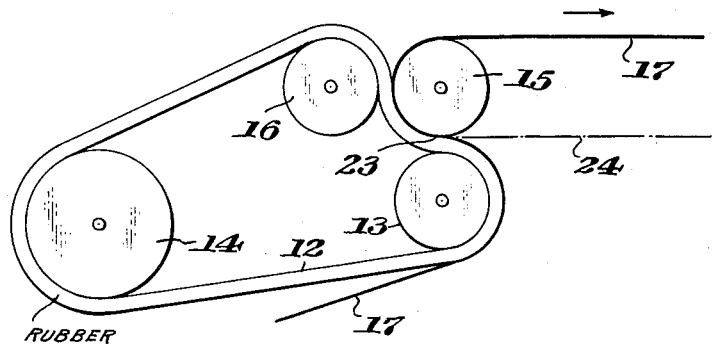
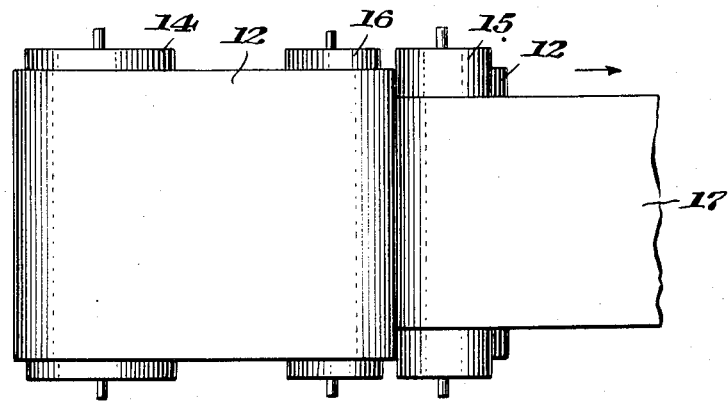
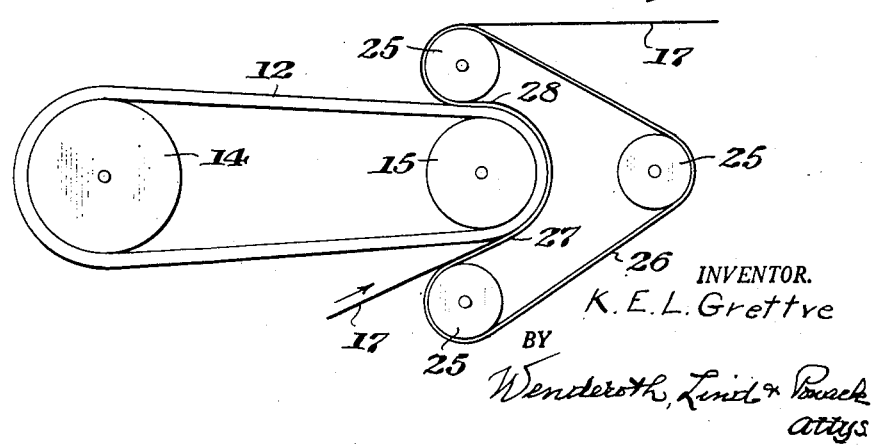
INVENTOR.
K. E. L. Grettve
BY
Wenderoth, Lind & Ponack
attys Patented Feb. 2, 1954

2,667,910

UNITED STATES PATENT OFFICE 2,667,910

APPARATUS AND METHOD FOR CREPING PAPER

Karl Einar Lage Grettve, Lilla Edet, Sweden

Original application July 12, 1945, Serial No. 604,639. Divided and this application December 22, 1949, Serial No. 134,398

Claims priority, application Sweden January 8, 1945

6 Claims. (Cl. 154—30)

This application is a division of application Serial No. 604,639, filed July 12, 1945, now Patent 2,535,734, entitled Method of Creping Paper and Other Crepable Foils.

When creping paper or other foils it has been proposed to use an endless band of rubber or other elastic material, passed over two rotating cylinders and periodically tensioned and untensioned, the foil being brought in contact with the band at a point where the band is tensioned and taken off from it at a point where the band is untensioned.

The invention has for its object to simplify this method by means of a machine using an elastic band of such a thickness that, during the passage of the band over a relatively small cylinder the outside of the band will become so much tensioned that the creping will be effected. This creping effect will be increased or the elastic band may be made thinner if another cylinder is arranged, over which the band and foil are passed and bent in a direction opposite to the direction caused by the first cylinder. Another way to increase the creping effect is to make that side of the band, which engages the face of the cylinders nonexpansible, or less expansible than the rest of the band.

The accompanying drawing shows diagrammatically two machines according to this invention. Figs. 1 and 2 show one machine from the side and from above using three cylinders for carrying and driving the elastic band. Fig. 3 shows the other machine from the side using two cylinders for the band.

In Figs. 1 and 2 an endless rubber band 12 is driven over two cylinders 13 and 14. When the band passes around the cylinders, its outer side becomes lengthened and its inner side relatively shortened. The thicker the band and the smaller the diameter of the cylinders, the greater the lengthening and the shortening will be. If a paper 17 is led on to the outer surface of the band where this passes on to the cylinder 13 the paper will make contact with a tensioned surface of the band. When the rubber band arrives at a point 23, where it leaves the cylinder 13, it will become untensioned and its surface regain its untensioned form, viz., the outer surface of the band will contract and thereby crepe the paper. This creping effect occurs when the point 23 is being passed. This effect can be increased by leading the rubber band over an additional cylinder 15, so that the band will become curved in an opposite direction and thus its outer surface shortened together with the paper, thus increasing the creping action. The additional cylinder 15 may be rotatable or stationary or be substituted by a guiding plate. In order to guide the rubber band when it passes the cylinder 15 still another cylinder 16 is used as shown.

The paper may be brought in at any point where the band is being bent over the cylinder 13 and before it reaches point 23, thus in any plane between those indicated by 17 and 24. The contraction takes place from point 23 to where band leaves cylinder 15.

In Fig. 3 the contraction occurs at point 28. In this case the paper is brought in at a point 27. A guide is arranged for the paper consisting of a belt 26 led over rolls 25. The belt is intended to keep the paper in contact with the rubber band with sufficient strength to cause the creping. The same purpose is filled by the cylinders 15 and 16 in Fig. 1.

The band shown may be provided on its inner surface, that is on that side which is turned against the cylinders 13 and 14, with a nonelastic or less elastic material. By this means the outside of the band will become stretched relatively more when passing the cylinder 13. It will also be contracted more when passing the cylinder 15. In such event a band of less thickness could be used than otherwise to obtain the same effect.

Having now particularly described and ascertained the nature of my said invention and in what manner the same is to be performed, we declare that what I claim is:

1. A method of creping foils by passing them between and endless band of elastic material and a guiding means consisting of a cylinder, the endless band having substantial thickness in relation to the diameter of the cylinder, comprising passing the endless band over the cylinder and thereby expanding the outer surface of the band in longitudinal direction of the band without materially stretching its inner surface, contacting the foil with the band at a point where its outer surface is expanded, feeding the foil between the band and the guiding means and diminishing the degree of expansion of the outer surface of the band while the foil is kept in contact with the band and the guiding means, and removing the foil from contact between the band and the guiding means at a point where the degree of expansion of the outer surface of the band is less than at that point where the foil entered into contact with the band.

2. A machine for creping foils comprising spaced tensioning cylinders, an endless band of elastic material passed over said cylinders without being materially stretched at its inner surface, guiding means in contact with the outer surface of said band, means for leading a foil to said band at a point where said band is expanded on one of said cylinders and means for taking off said foil at a point where said band is less expanded, said band having substantial thickness in relation to the diameter of said cylinder on which said band is expanded, whereby, when said band is bent over this cylinder, the outwardly directed surface of said band which is to cause the creping effect, is first lengthened and thereafter shortened when said band leaves said last mentioned cylinder and said foil is creped by contraction of the outer surface of said band.

3. A machine as claimed in claim 2 wherein said guiding means is a cylinder in the space between two said cylinders over which said band is passed, said additional cylinder being spaced from said two cylinders a distance whereby the outer surface of said band after having been expanded by passing over said two cylinders is bent in the opposite direction for causing said foils to be further creped when passing between said band and said additional cylinder.

4. A machine as claimed in claim 2 wherein said guiding means comprise a belt for leading said foil to said band at a point where the band is expanded, rolls supporting said belt, said belt being led over said rolls in contact with the outer surface of said cylinder and leaving contact at a point where the degree of expansion of the outer surface of said band is less than at the point where said belt enters in contact with said band.

5. A machine as claimed in claim 2 wherein the inner side of said band is of non-elastic material.

6. A machine as claimed in claim 2 wherein the inner side of said band comprises a material less elastic than the remainder of said band.

KARL EINAR LAGE GRETTVE.

References Cited in the file of this patent

UNITED STATES PATENTS

| Number | Name | Date |
|---|---|---|
| 1,643,147 | Angier | Sept. 20, 1927 |
| 1,679,996 | Tracy | Aug. 7, 1928 |
| 2,021,975 | Wrigley et al | Nov. 26, 1935 |
| 2,245,014 | Sherman | June 10, 1941 |
| 2,294,957 | Caldwell | Sept. 8, 1942 |
| 2,409,066 | Powell et al. | Oct. 8, 1946 |

FOREIGN PATENTS

| Number | Country | Date |
|---|---|---|
| 376,040 | Great Britain | July 7, 1932 |
| 418,432 | Great Britain | Oct. 24, 1934 |
| 179,746 | Switzerland | Dec. 2, 1935 |
| 467,307 | Canada | Aug. 15, 1950 |